(12) United States Patent
Jung et al.

(10) Patent No.: US 12,530,424 B2
(45) Date of Patent: Jan. 20, 2026

(54) DEEP LEARNING SYSTEM FOR FINITE ELEMENT APPROXIMATION AND STIFFNESS MATRIX GENERATION APPARATUS ACCORDING TO REFERENCE DATA MODEL

(71) Applicant: KOREA ATOMIC ENERGY RESEARCH INSTITUTE, Daejeon (KR)

(72) Inventors: Jaeho Jung, Daejeon (KR); Yonggyun Yu, Daejeon (KR); Jeyong Yu, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 1147 days.

(21) Appl. No.: 17/410,984

(22) Filed: Aug. 24, 2021

(65) Prior Publication Data

US 2022/0129520 A1 Apr. 28, 2022

(30) Foreign Application Priority Data

Oct. 28, 2020 (KR) .......................... 10-2020-0141507

(51) Int. Cl.
*G06F 17/16* (2006.01)
*G06F 30/23* (2020.01)
(Continued)

(52) U.S. Cl.
CPC .............. *G06F 17/16* (2013.01); *G06N 3/04* (2013.01); *G06N 3/08* (2013.01);
(Continued)

(58) Field of Classification Search
CPC ........... G06F 17/16; G06F 30/23; G06N 3/04; G06N 3/08; G06N 3/084; B66B 2201/404
See application file for complete search history.

(56) References Cited

U.S. PATENT DOCUMENTS

2020/0100871 A1* 4/2020 Wang ...................... G06F 17/18

FOREIGN PATENT DOCUMENTS

| JP | 4433769 B2 | 3/2010 |
|---|---|---|
| KR | 10-1853237 B1 | 4/2018 |
| KR | 10-2018-0120061 A | 11/2018 |

OTHER PUBLICATIONS

Gao et al.,( NPL "Deep Learning Approach Replacing the Finite Difference Method for In situ Stress Prediction" Published 2020 (12 pages (Year: 2020).*

(Continued)

*Primary Examiner* — Quoc A Tran
(74) *Attorney, Agent, or Firm* — Hauptman Ham, LLP

(57) ABSTRACT

The present disclosure includes a data generation unit to generate a normalized finite element as training data, a strain computation unit to compute reference strain values based on the generated training data, a deep learning network including a plurality of layers each having a preset weight and to generate a matching matrix, in which the reference strain values and displacements set for the training data match each other based on arbitrary attribute information and geometric information as position information related to variable points, and a training control unit to train the deep learning network based on a cost function by which differences between strain values computed according to the matching matrix and the reference strain values are equal to or smaller than a threshold value.

8 Claims, 12 Drawing Sheets

(51) Int. Cl.
*G06N 3/04* (2023.01)
*G06N 3/08* (2023.01)
*G06N 3/084* (2023.01)

(52) U.S. Cl.
CPC ........ *B66B 2201/404* (2013.01); *G06F 30/23* (2020.01); *G06N 3/084* (2013.01)

(56) References Cited

OTHER PUBLICATIONS

Choi, Byung Han et al., "Design of Steel Structures Using the Neural Networks with Improved Learning," Magazine and Journal of Korean Society of Steel Construction 2015, Dec. 2005, vol. 17, No. 6, pp. 661-672; with English Abstract.

Gong, Ming et al., "Finite Element Model Updating of Structures Using Deep Neural Network," Journal of the Korean Society of Civil Engineers, Feb. 2019, vol. 39, No. 1, pp. 147-154; with English Abstract.

[Supportive materials for Exception to Loss of Novelty] Jaeho Jung et al., "Stiffness Matrix Generation of Finite Elements using Deep Learning," Symposium of Computational Structural Engineering Institute of Korea; Published on Aug. 24, 2020 for the corresponding Korean Patent Application No. 10-2020-0141507.

Prior Art Search Report in connection with the corresponding Korean Patent Application No. 10-2020-0141507.

\* cited by examiner (a)

$$\begin{bmatrix} 1 & 0 & 0 & 0 & 0 & 0 & 0 & -1 & 0 & 0 & 0 & 0 & 0 & 0 & 0 \\ 0 & 1 & 0 & 0 & 0 & 0 & 0 & -1 & 0 & 0 & 0 & 0 & 0 & 0 & 0 \\ 0 & 0 & 1 & 0 & 0 & 0 & 0 & -1 & 0 & 0 & 0 & 0 & 0 & 0 & 0 \\ 0 & 0 & 0 & 1 & 0 & 0 & 0 & -1 & 0 & 0 & 0 & 0 & 0 & 0 & 0 \\ 0 & 0 & 0 & 0 & 1 & 0 & 0 & -1 & 0 & 0 & 0 & 0 & 0 & 0 & 0 \\ 0 & 0 & 0 & 0 & 0 & 1 & 0 & -1 & 0 & 0 & 0 & 0 & 0 & 0 & 0 \\ 0 & 0 & 0 & 0 & 0 & 0 & 1 & -1 & 0 & 0 & 0 & 0 & 0 & 0 & 0 \\ 0 & 0 & 0 & 0 & 0 & 0 & 0 & 1 & 0 & 0 & 0 & 0 & 0 & 0 & -1 \\ 0 & 0 & 0 & 0 & 0 & 0 & 0 & 0 & 1 & 0 & 0 & 0 & 0 & 0 & -1 \\ 0 & 0 & 0 & 0 & 0 & 0 & 0 & 0 & 0 & 1 & 0 & 0 & 0 & 0 & -1 \\ 0 & 0 & 0 & 0 & 0 & 0 & 0 & 0 & 0 & 0 & 1 & 0 & 0 & 0 & -1 \\ 0 & 0 & 0 & 0 & 0 & 0 & 0 & 0 & 0 & 0 & 0 & 1 & 0 & 0 & -1 \\ 0 & 0 & 0 & 0 & 0 & 0 & 0 & 0 & 0 & 0 & 0 & 0 & 1 & 0 & -1 \\ 0 & 0 & 0 & 0 & 0 & 0 & 0 & 0 & 0 & 0 & 0 & 0 & 0 & 1 & -1 \end{bmatrix}$$

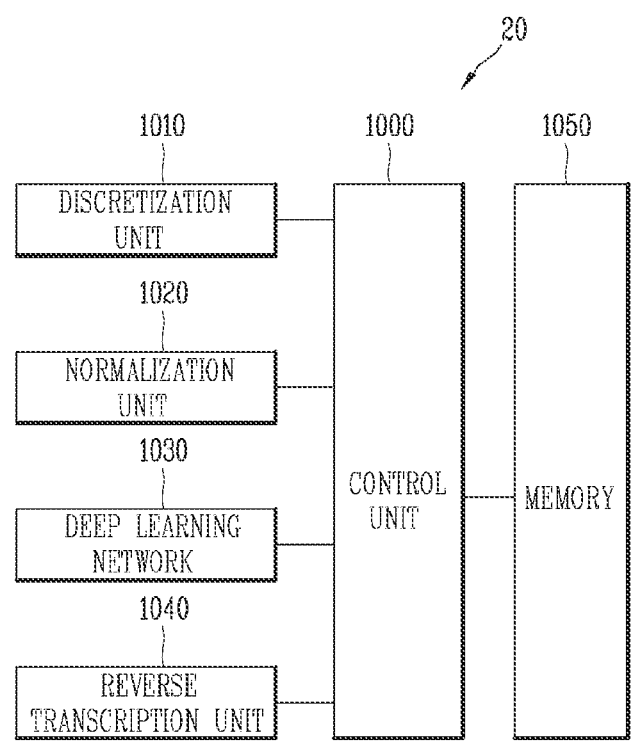

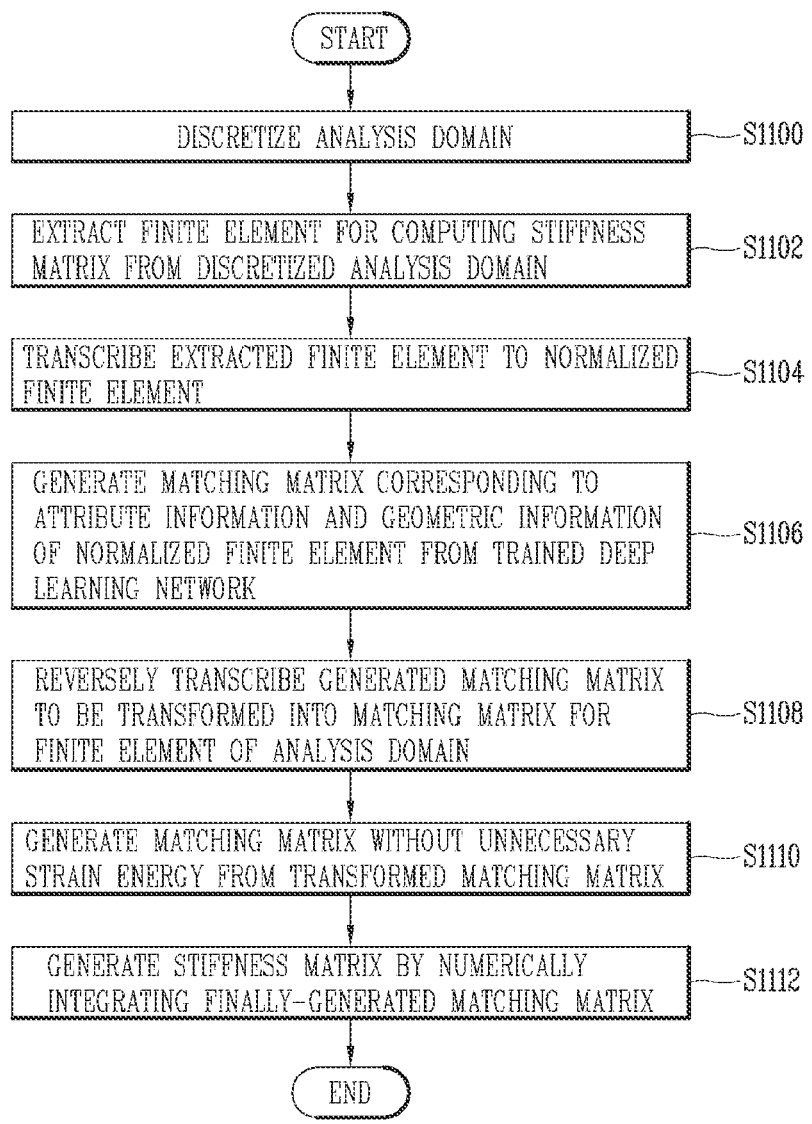

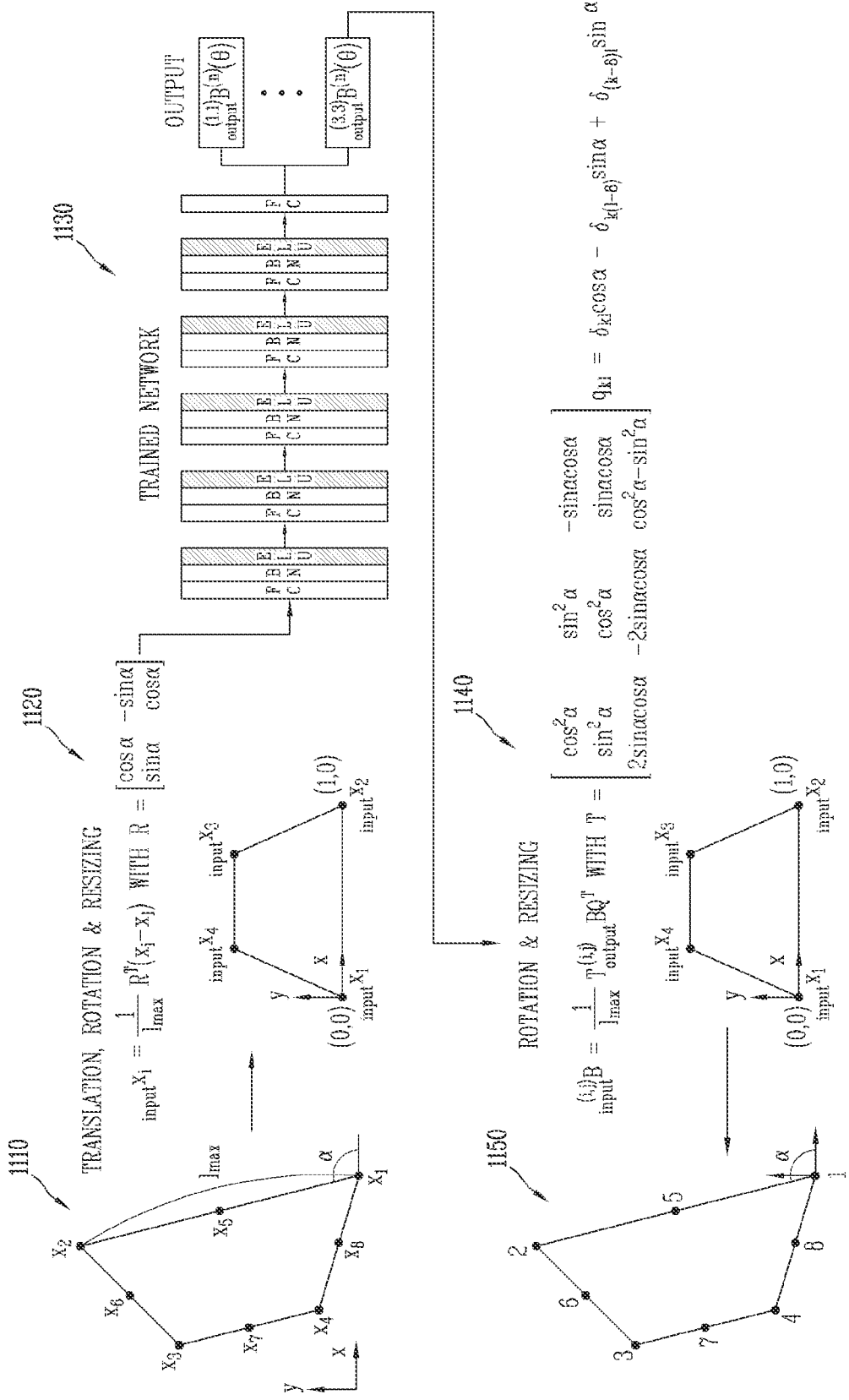

DEEP LEARNING SYSTEM FOR FINITE ELEMENT APPROXIMATION AND STIFFNESS MATRIX GENERATION APPARATUS ACCORDING TO REFERENCE DATA MODEL

CROSS-REFERENCE TO RELATED APPLICATION

Pursuant to 35 USC § 119(a), this application claims the benefit of earlier filing date and right of priority to Korean Application No. 10-2020-0141507, filed on Oct. 28, 2020, the contents of which is incorporated by reference herein in its entirety.

BACKGROUND

1. Technical Field

The present disclosure relates to a stiffness matrix generation of finite elements, and more particularly, a deep learning system that performs training to approximate finite elements, and an apparatus for generating a stiffness matrix based on reference data approximated through the trained deep learning system.

2. Description of the Related Art

The finite element method is a numerical approximate solution that can be applied when it is difficult to directly obtain an accurate theoretical solution for a domain having various shapes, namely, a method of discretizing the domain having the various shapes, that is, an analysis domain into a finite number of elements, calculating characteristics of the discretized elements, namely, the individual finite elements, respectively, combining the characteristics of all of the elements, and approximating the characteristics for the entire analysis domain. This finite element method is used in various types of numerical analysis such as structural analysis, electromagnetic analysis, flow analysis, heat transfer analysis, and the like.

On the other hand, typically, the discretized elements, used in the finite element method assumes an internal field as an interpolation function such as a shape function. However, this assumption does not reflect changes in function according to shapes and physical properties of the elements, and causes an error according to changes in physical properties and shapes. Therefore, in order to prevent those problems, finite element analysis is generally performed using more elements, which requires more computation time, so there is a problem in that computational efficiency is lowered.

As an effort of solving the problems, a research has been attempted to analyze an analysis domain in various shapes through a trained deep learning network by applying an artificial intelligence-related technology to numerical analysis. However, the method of applying the deep learning to the numerical analysis typically has an advantage of obtaining very excellent numerical analysis performance for an analysis area, namely, an analysis domain selected as a model by training the entire analysis domain as a single model.

However, when the deep learning network is applied to the numerical analysis as described above, there is a problem that the training for the deep learning network is dependent on the domain selected as the model. Accordingly, the trained deep learning network cannot be used when the domain is changed.

SUMMARY

The present disclosure is to solve the above and other problems, and one aspect of the present disclosure is to provide an apparatus for generating a stiffness matrix of finite elements, capable of computing a stiffness matrix of an analysis domain more accurately and quickly than when computing a stiffness matrix of an analysis domain according to a finite element method assuming an internal field as an interpolation function.

The present disclosure is to solve the above and other problems, namely, another aspect of the present disclosure is to provide a deep learning system capable of training a deep learning network to be applied even to other domains, irrespective of a domain, and an apparatus for generating a stiffness matrix for a domain to be analyzed through the deep learning system.

According to one aspect of the present disclosure in order to achieve the above or other aspects, there is provided a deep learning system according to an implementation including a data generation unit to generate a finite element normalized with fixed points and variable points as training data, a strain computation unit to compute reference strain values based on the generated training data, a deep learning network including a plurality of layers having preset weights, respectively, and connected to one another, and to generate a matching matrix for matching the reference strain values with displacements set in the training data according to arbitrary attribute information set in the training data and geometric information as position information related to the variable points, and a training control unit to train the deep learning network with respect to a plurality of training data each generated by the data generation unit based on a cost function by which differences between strain values computed according to the matching matrix and the reference strain values are equal to or smaller than a threshold value.

In one implementation, the data generation unit may generate a geometry, which is the normalized finite element, as the training data, and the geometry may be formed by two fixed points connected to each other in a horizontal direction with being spaced apart by a preset unit distance, two variable points connected to the respective fixed points, a side connecting the fixed points, sides connecting the fixed points and the variable points, and a side connecting the variable points without intersecting with other sides.

In one implementation, the data generation unit may impose generation of training data unsuitable for training through a preset exclusion condition, and the exclusion condition may be set based on at least one of a range of an interior angle of the generated geometry and a ratio of lengths of the respective sides forming the geometry.

In one implementation, the strain computation unit may discretize a geometry corresponding to the training data by assuming that the geometry is an analysis domain, determine positions of integration points from the discretized analysis domain, compute strain values corresponding to the integration points by reflecting the attribute information applied to the training data, and store the computed strain values of the respective integration points as the reference strain values.

In one implementation, the strain computation unit may determine displacement points by applying displacements according to a preset condition to the geometry corresponding to the training data, and generate a data set including the determined displacement points, the reference strain values, the attribution information applied to the training data, and the geometric information.

In one implementation, the data set may include input data input to the deep learning network, and label data for verifying a matching matrix generated from the deep learning network to which the input data is input. The input data may include the attribute information set in the training data and geometric information related to the training data, and the label data may be identification information related to the training data corresponding to the input data. The label data may include displacements set in the training data corresponding to the input data and reference strain values computed from the training data corresponding to the input data.

In one implementation, the cost function may be configured to compute differences between the reference strain values and results obtained by multiplying the matching matrix, generated as a result of inputting the attribution information and the geometric information to the deep learning network, by displacements of the training data corresponding to the attribution information and the geometric information, and the training control unit may train the deep learning network to generate a matching matrix in which values of the cost function are approximated to zero.

In one implementation, the training control unit may transform the matching matrix generated through the deep learning network into a matching matrix including a zero energy mode by reflecting a preset transformation matrix when the deep learning network is completely trained.

According to one aspect of the present disclosure in order to achieve the above or other aspects, there is provided a stiffness matrix generation apparatus including a normalization unit to transcribe an initial finite element obtained by discretizing an analysis domain to be analyzed to a normalized finite element having fixed points and variable points, a deep learning network trained to generate a matching matrix for matching input displacement information with reference strain values based on arbitrary attribute information and geometric information as position information related to arbitrary variable points, a reverse transcription unit to perform a reverse transcription process with respect to the normalization, for the matching matrix generated from the deep learning network, and a control unit to extract attribute information and geometric information as position information related to the variable points from the normalized finite element, generate a matching matrix by inputting the extracted information to the deep learning network, transform the matching matrix into a matching matrix for the initial finite element by controlling the reverse transcription unit, and generate a stiffness matrix for the initial finite element from the transformed matching matrix.

In one implementation, the normalization unit may transcribe the initial finite element into the normalized finite element by selecting some of vertices constituting the initial finite element as the fixed points, rotating the extracted finite element based on one of the selected fixed points, and resizing the rotated finite element such that a distance between the fixed points satisfies a preset unit distance.

In one implementation, the reverse transcription unit may transform the matching matrix into the matching matrix for the initial finite element by reflecting reverse transcription information for restoring the normalized finite element to the initial finite element to the matching matrix generated from the deep learning network.

In one implementation, the deep learning network may transform the matching matrix into a matching matrix including a zero energy mode by further reflecting a preset transformation matrix to the matching matrix generated from the attribute information and geometric information extracted from the normalized finite element.

In one implementation, when the matching matrix for the initial finite elements is generated through the reverse transcription unit, the control unit may correct the generated matching matrix to a matching matrix generating only strain values by a tensile force generated in a preset at least one axis.

In one implementation, the control unit may generate a stiffness matrix for the initial finite elements by performing a numerical integration with respect to the matching matrix for the initial finite elements according to Equation below.

$$K = t \sum_{i=1}^{P} \sum_{j=1}^{P} {}^{(i,j)}w^{(i,j)}B^T C^{(i,j)} B^{(i,j)} J \quad \text{[Equation]}$$

where t denotes a thickness, $\mathcal{W}$ denotes the Gaussian numerical integration weight, $^{(i,j)}B$ denotes the corrected matching matrix, $^{(i,j)}B^T$ denotes a transposed matrix of $^{(i,j)}B$, $C^{(i,j)}$ denotes a constitutive matrix that translates strain into stress, and J denotes a determinant of the Jacobian matrix, and where $^{(i,j)}w$ denotes the weight factor at the Gauss point $(r_i, s_j)$ $^{(i,j)}J$=det $J(r_i,s_j)$, and $^{(i,j)}B=B(r_i,s_j)$.

BRIEF DESCRIPTION OF THE DRAWINGS

FIG. 9 is an exemplary view illustrating an example of a transformation matrix for transforming a generated matching matrix into a matrix that imposes strains from being generated with respect to a rigid body motion in a deep learning system according to an implementation of the present disclosure.

FIG. 10 is a block diagram illustrating a structure of a stiffness matrix generation apparatus for generating a stiffness matrix of an actual analysis domain using a deep learning network trained from a deep learning system in accordance with an implementation of the present disclosure.

FIG. 11 is a flowchart illustrating a process of generating a stiffness matrix from finite elements by a stiffness matrix generation apparatus in accordance with an implementation of the present disclosure.

FIG. 12 is a conceptual view illustrating a process of generating a stiffness matrix from finite elements by a stiffness matrix generation apparatus in accordance with an implementation of the present disclosure.

DETAILED DESCRIPTION OF THE IMPLEMENTATIONS

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Hereinafter, exemplary implementations disclosed herein will be described in detail with reference to the accompanying drawings.

Figure 1:
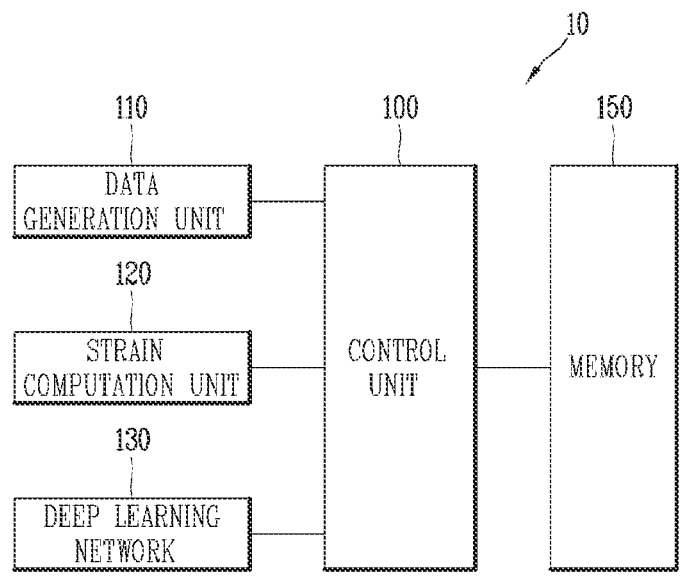
FIG. 1 is a block diagram illustrating a structure of a deep learning system in accordance with one implementation of the present disclosure.

FIG. 1 is a block diagram illustrating a structure of a deep learning system 10 in accordance with one implementation of the present disclosure.

As illustrated in FIG. 1, a deep learning system 10 according to an implementation of the present disclosure may include a training control unit 100, a data generation unit 110 connected to the training control unit 100, a strain computation unit 120, and a deep learning network 130. FIG. 1 shows the deep learning system 10 having those various components, but it may be understood that implementing all of the illustrated components is not a requirement. Greater or fewer components may alternatively be implemented.

More specifically, among those components, the data generation unit 110 may generate training data for training the deep learning network 130. The data generation unit 110 may generate training data according to a preset normalized representation for unit domains, i.e., finite elements obtained by discretizing an analysis domain.

For example, the data generation unit 110 may generate a shape having four vertices as training data, and two of the four vertices may be fixed points which are horizontally spaced apart from each other by a preset unit length (hereinafter, referred to as a length '1'). In this case, if coordinates of any one of the fixed points are assumed to be the origin, that is, (0,0), coordinates of the other fixed point may be (1,0).

Meanwhile, the remaining two vertices may be variable points whose positions are arbitrarily set. That is, the data generation unit 110 may generate an arbitrary geometry, which has vertices defined by two fixed points and two variable points with positions arbitrarily determined, as training data.

Therefore, a geometry, which is formed by two fixed points connected to each other with being spaced apart by a preset unit length '1' and two variable points connected to the respective fixed points, a side connecting the fixed points, sides connecting the fixed points and the variable points, and a side connecting the variable points without intersecting with other sides, may be generated as training data. In this case, since a quadrilateral geometry having a specific shape can be generated according to the positions of the variable points, training data for four-node finite elements of various types may be generated.

On the other hand, when the positions of the variable points are completely arbitrarily determined, inappropriate training data may be generated. As an example, if an interior angle of any one of the variable points is greater than a specific degree (e.g., 180 degrees), a quadrilateral shape may not be maintained and a triangular shape may be formed. In this case, since it cannot be regarded as desirable training data, the data generation unit 110 may determine arbitrary positions of the variable points based on a preset exclusion condition.

The exclusion condition may be set in various ways. For example, as described above, the exclusion condition may be related to the interior angle of the variable point of the generated geometry. Alternatively, it may be related to a ratio of a maximum side length to a minimum side length of the generated geometry. In this case, the data generation unit 110 may delete a generated geometry if the generated geometry corresponds to the exclusion condition. In this case, the deleted geometry may not be used as training data.

On the other hand, if the generated geometry does not correspond to the exclusion condition, the data generation unit 110 may input the generated geometry as training data to the training control unit 100. Then, the training control unit 100 may input the input training data to the strain computation unit 120.

The strain computation unit 120 may extract strain values from different points of the geometry corresponding to the input training data. In more detail, the strain computation unit 120 may determine intermediate nodes corresponding to displacement points according to displacement values arbitrarily mapped to the geometry corresponding to the training data. The strain computation unit 120 may also extract strain values from a plurality of integration points determined from the geometry corresponding to the training data. In addition, the extracted strain values may be stored as reference strain values of the training data.

Meanwhile, the strain values may be determined according to attribute such as an elastic modulus or Poisson's ratio of the geometry as well as the displacement points. Here, the displacement point may be generated for each side of the geometry according to a displacement value mapped to the geometry within a preset range. The elastic modulus or Poisson's ratio may also be arbitrarily determined within an arbitrary range.

Accordingly, the strain computation unit 120 may compute strain values according to the arbitrarily determined attribute. The computed strain values and displacement points may be stored as data corresponding to the training data.

In this case, since the strain values and the displacement points are computed according to the positions of the variable points of the corresponding training data and the applied attribute, the training control unit 100 may store the strain values, the displacement points, the positions of the variable points, and the applied attribute as a data set corresponding to the training data.

In this case, information related to the positions of the variable points may be information related to the geometry corresponding to the training data, and thus may be used as input data which is input to the deep learning network to compute the strain values through the deep learning network. The attribute may also be used as the input data which is input to the deep learning network to compute the strain values through the deep learning network.

And the strain values and the displacement points may be results of a strain computation according to an operation result of the deep learning network when the input data is input to the deep learning network, and thus may be used as label data corresponding to reference strain values of input training data.

Meanwhile, the deep learning network 130 may have a neural network structure in which a plurality of layers including factors forming an output by multiplying an input by various weights are connected in the form of artificial neurons. The deep learning network 130 may be trained such that the weights of factors constituting each layer repeatedly change according to a preset cost function so as to output a result, meeting a preset condition, with respect to input data, that is, training data.

On the other hand, when geometric information, namely, position information related to the variable points and attribute applied to the training data, namely, attribute information, which correspond to the input data, are input from the computed data set, the deep learning network 130 according to an implementation of the present disclosure may generate a strain-displacement matching matrix (hereinafter, referred to as a matching matrix) corresponding to the input geometric information and attribute information.

An initial value of the matching matrix may be set according to initial weight values set in the deep learning network 130. The initial weight values of the deep learning network 130 may be determined according to a preset initialization algorithm such as a preset Xavier initializer.

Meanwhile, the matching matrix may have a relationship in which a strain value is computed when a vector value corresponding to a displacement is multiplied. That is, the relationship between the strain value and the displacement may be defined as expressed by Equation 1 below.

$$\vec{\varepsilon} = B \times \vec{u} \quad \text{[Equation 1]}$$

Here, $\vec{\varepsilon}$ denotes a strain vector, B denotes the strain-displacement matrix, $\vec{u}$ denotes the nodal displacement vector.

In addition, as the weights of the deep learning network 130 change according to a preset cost function, at least one of values constituting the matching matrix may change. While the process of changing the weights according to the cost function is repeated, the training for the deep learning network 130 may be performed.

Meanwhile, the training control unit 100 may control the data generation unit 110 to generate a plurality of training data that do not correspond to a preset exclusion condition. In addition, the training control unit 100 may store the generated plurality of training data in the memory 150 and control the strain computation unit 120 to compute strain values for the respectively stored training data. In addition, data sets for the respective training data may be generated based on the computed strain values, and input data of the respectively generated data sets may be input to the deep learning network 130.

And the training control unit 100 may train the deep learning network 130 by changing the weights of the factors constituting the layers of the deep learning network 130, based on the cost function to minimize a difference between the strain value obtained by multiplying the matching matrix generated through the deep learning network 130, to which the geometric information and the attribute information have been input, by the displacement, as expressed by Equation 1, and the strain value, namely, the reference strain value according to the label data of the data set corresponding to the geometric information and the attribute information.

Meanwhile, the memory 150 may store data for the operation of the deep learning system 10 according to the implementation of the present disclosure. For example, the memory 150 may store training data generated by the data generation unit 10, and store data by which the strain computation unit 120 computes the strain values for each training data.

In addition, when the strain values are computed through the strain calculation unit 120, the memory 150 may store a data set which is generated by including the geometric information and the attribute information related to the training data corresponding to the computed strain values. The memory 150 may also store data which is required for the operation of the cost function for training the deep learning network 130, weights set respectively for the factors of the deep learning network 130, and matching matrices computed from the deep learning network 130 during training.

Hereinafter, implementations related to a control method that can be implemented in the deep learning system 10 having the aforementioned configuration will be described with reference to the accompanying drawings. It will be apparent to those skilled in the art that the present disclosure may be embodied in other specific forms without departing from the scope or essential characteristics thereof.

Figure 2:
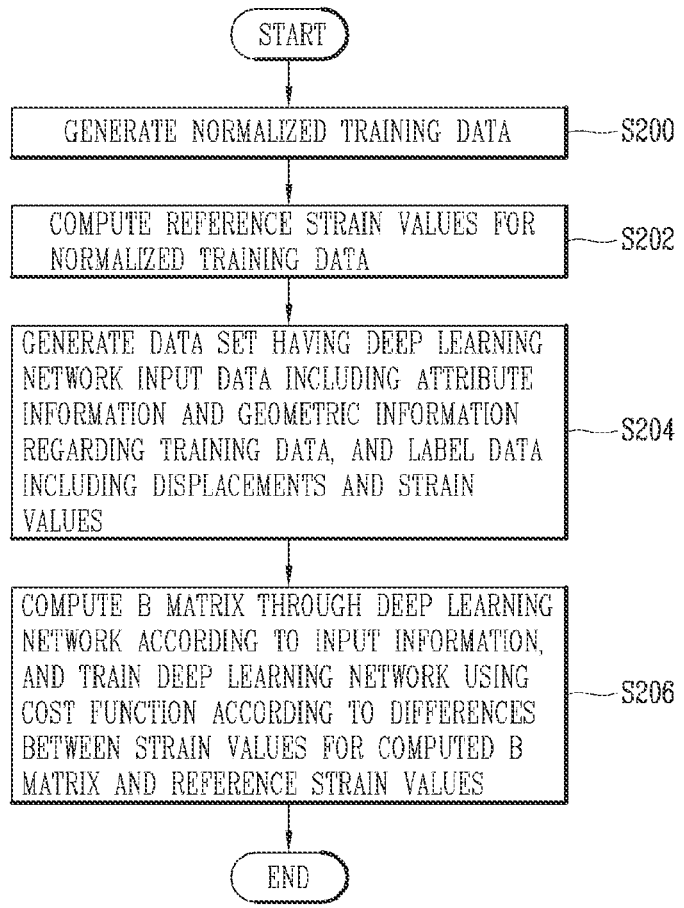
FIG. 2 is a flowchart illustrating a process of performing training for finite elements in a deep learning system in accordance with an implementation of the present disclosure.
Figure 3A:
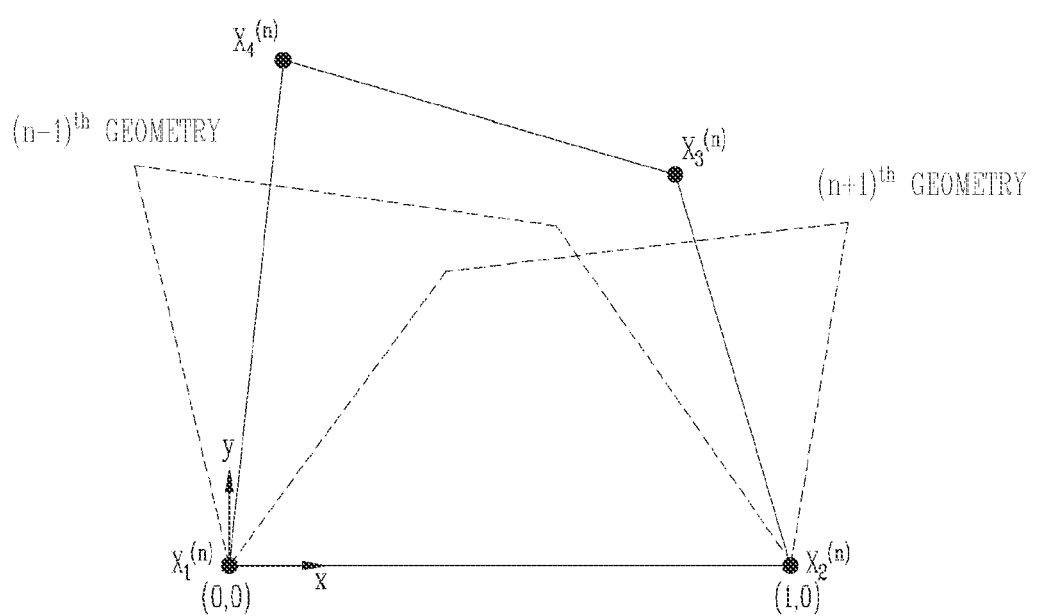
FIG. 3A is a diagram illustrating normalized finite element training data which is generated for training a deep learning system in accordance with an implementation of the present disclosure.
Figure 3B:
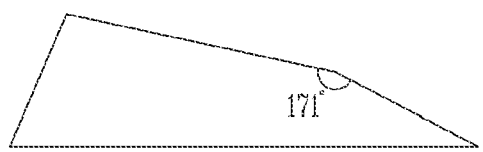
FIG. 3B is an exemplary view illustrating examples of geometries exceeding the limit of geometry imposed in a deep learning system in accordance with an implementation of the present disclosure.
Figure 3B:
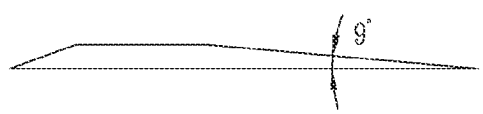
Figure 3B:
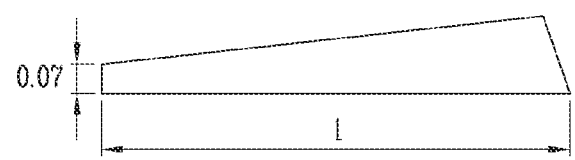

FIG. 2 is a flowchart illustrating a process of training the deep learning system 10 in accordance with an implementation of the present disclosure. FIGS. 3A and 3B are diagrams illustrating examples of normalized finite element training data generated for training in a deep learning system in accordance with an implementation of the present disclosure.

Referring to FIG. 2, the training control unit 100 of the deep learning system 10 may first control the data generation unit 110 to generate normalized training data (S200). Here, the normalized training data may be a geometry having four vertices with two fixed points and two variable points, as described above.

In this case, the fixed points may be spaced apart from each other by a preset unit length. When the unit length is '1' and a position of any one fixed point (first point X1 in FIG.

3A) is set to the origin, namely, coordinates of (0,0), coordinates of another fixed point (second point X2 in FIG. 3A) may be set to a position (1,0) as shown in FIG. 3A.

In addition, a third point X3 and a fourth point X4 of the geometry shown in FIG. 3A may be variable points whose positions are arbitrarily determined. That is, the normalized training data may be an arbitrary quadrilateral geometry having four vertices including the fixed points corresponding to the coordinates of (0,0) and (1,0) and the two variable points whose positions are arbitrarily determined.

Meanwhile, as described above, for more efficient training, the training control unit 100 may prevent generation of training data, which is unsuitable for training, through a preset exclusion condition. As an example, the exclusion condition may be set based on a range of an interior angle or a ratio of lengths of sides forming the geometry.

[Training Data Exclusion Condition]
When an interior angle is smaller than 10 degrees or greater than 170 degrees
When the longest side is 10 times or more of the shortest side in length As an example, in the case of (a) of FIG. 3B, it is assumed that a geometry in which an interior angle of any one vertex is greater than 170 degrees is generated according to the positions of the variable points. On the other hand, in the case of (b) of FIG. 3B, it is assumed that a geometry in which an interior angle of any one vertex is smaller than 10 degrees is generated according to the positions of the variable points. In addition, in the case of (c) of FIG. 3B, it is assumed that a specific side is too short compared to the other sides (the length of the longest side is 10 times or more of the length of the shortest side).

In the case of these shapes, as shown in FIG. 3B, since geometries close to a triangular shape are generated, the training control unit 100 may determine that the generated geometries are inappropriate data for training. Therefore, the generated geometries may not be stored as normalized training data.

Also, the training control unit 100 may set the Poisson's ratio as attribute information. Here, the Poisson's ratio means a ratio of strain in a vertical direction with respect to strain in a horizontal direction, and may be set according to uniform distribution within a preset range (0 to 0.499999999).

Here, it goes without saying that the training control unit 100 may set another attribute such as an elastic modulus, in addition to the Poisson's ratio, as the attribute information. However, since the strain is greatly affected by the Poisson's ratio compared to the elastic modulus, the training control unit 100 may set the Poisson's ratio as the attribute information and apply the set Poisson's ratio to the generated training data.

Meanwhile, the Poisson's ratio is a physical property corresponding to a material, and may be a value determined according to a material of an analysis domain to be analyzed. Accordingly, as the Poisson's ratio is applied to the training data, training corresponding to a physical property of a specific material may be performed according to the Poisson's ratio.

Hereinafter, for convenience of description, an example in which the Poisson's ratio is applied as the attribute information to normalized training data will be described. However, this is merely illustrative, and the present disclosure may not be limited to this. That is, it goes without saying that any information other than the Poisson's ratio may be applied as attribute information.

On the other hand, when the normalized training data to which the Poisson's ratio is applied as the attribute information is generated, the training control unit 100 may control the strain calculating unit 120 to compute a plurality of strain values from the geometry according to the normalized training data. Here, the computed strain values may be reference strain values (S202).

To this end, the training control unit 100 may discretize the training data. Positions of integration points may be determined from the geometry of the discretized training data. In addition, arbitrary displacement values may be mapped to the discretized domain and displacement points may be determined according to the mapped displacement values. Strain values at the integration points may be computed, respectively, thereby obtaining a plurality of strain values corresponding to the training data.

Figure 4:
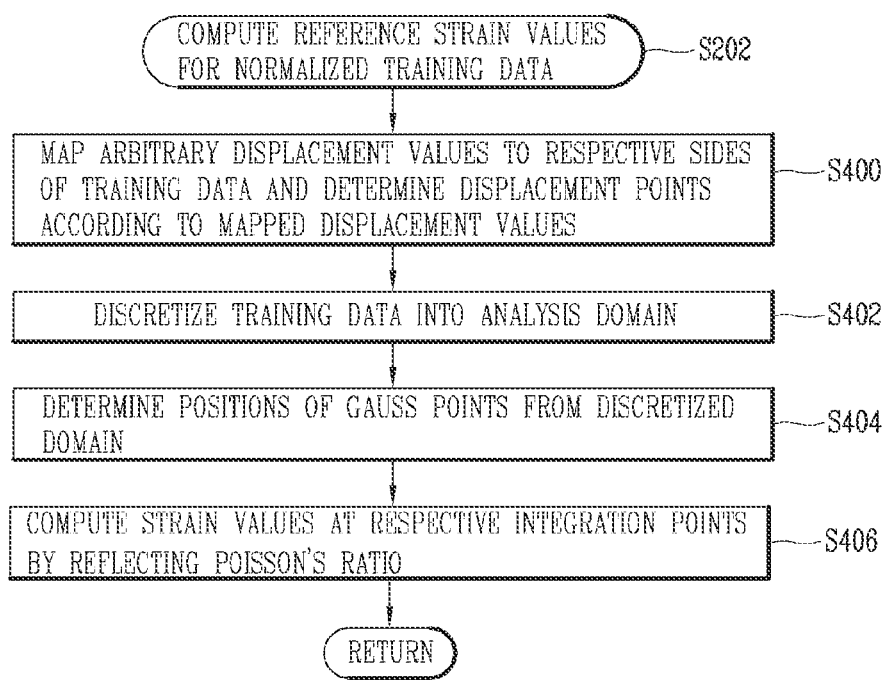
FIG. 4 is a flowchart illustrating in more detail a process of computing reference strain values from normalized finite element training data in a deep learning system in accordance with an implementation of the present disclosure.
Figure 5:
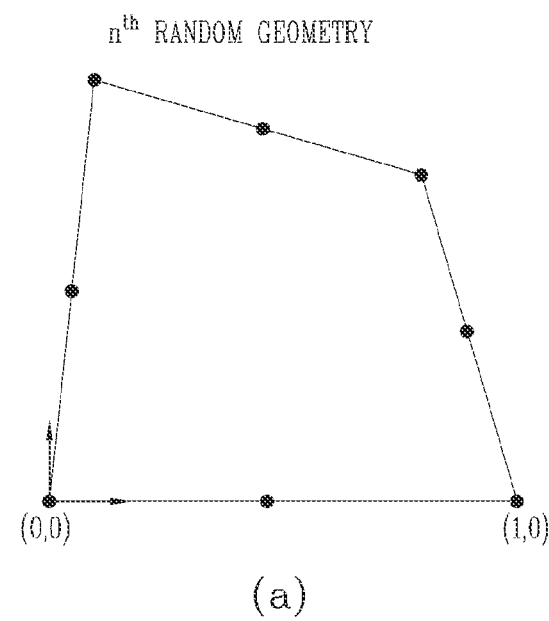
FIG. 5 is an exemplary view illustrating finite elements discretized to compute strain values in a deep learning system in accordance with an implementation of the present disclosure.
Figure 5:
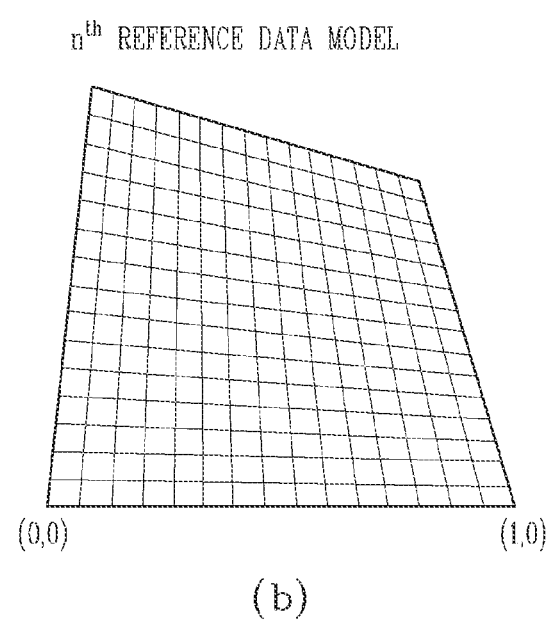
Figure 6:
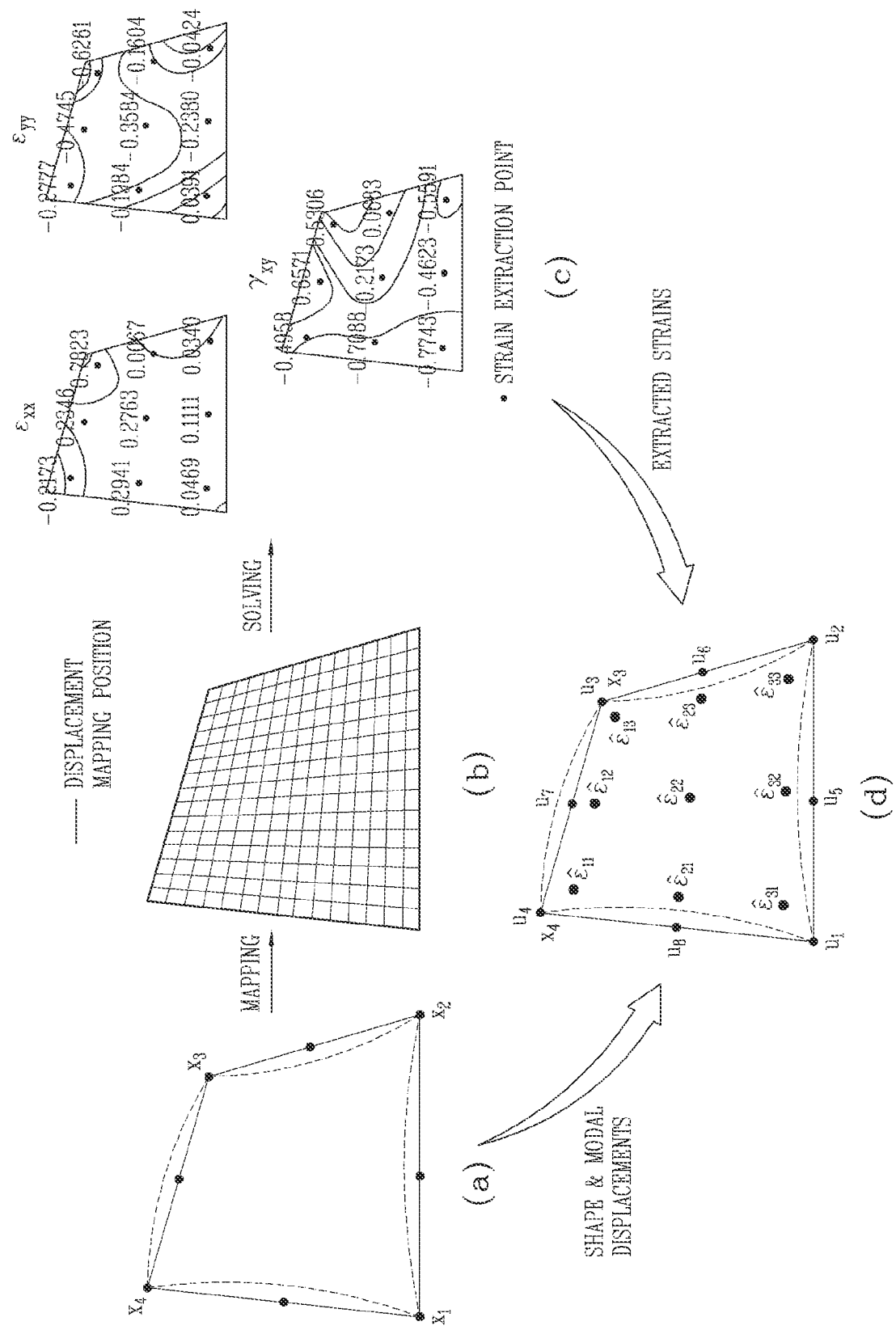
FIG. 6 is a diagram illustrating an example of computing reference strain values from discretized finite elements in a deep learning system in accordance with an implementation of the present disclosure.

Hereinafter, the process of step S202 in FIG. 2 of computing the reference strain values from the normalized training data in the deep learning system 10 according to the implementation of the present disclosure will be described in more detail with reference to FIGS. 4 to 6. FIG. 4 is a flowchart illustrating the process of step S202 in more detail. FIG. 5 is an exemplary view illustrating finite elements discretized to compute strain values in the deep learning system in accordance with an implementation of the present disclosure. FIG. 6 is a diagram illustrating an example of computing reference strain values from discretized finite elements in the deep learning system in accordance with an implementation of the present disclosure.

First, as illustrated in FIG. 4, the training control unit 100 of the deep learning system 10 may first map arbitrary displacement values to respective sides of the geometry corresponding to the normalized training data. In addition, displacement points may be determined from each side and vertex of the geometry corresponding to the training data based on the mapped displacement values. In this case, when the training data is formed as the geometry having four vertices as described above, the four vertices and four intermediate nodes formed on each of four sides may be determined as the displacement points (S400).

For example, the training control unit 100 may map the displacement value according to an arbitrary value in a uniform distribution ranging from −0.25 to +0.25. The displacement in the uniform distribution ranging from −0.25 to +0.25 is a numerical value that can have strain up to 50% when viewed from a normalized shape restrained to a maximum size of 1, and thus a sufficiently wide range is used as an input in terms of characteristics of finite elements assuming small-strains.

(a) of FIG. 6 illustrates an example in which arbitrary displacement values are mapped to the respective sides of the geometry corresponding to the training data. (a) of FIG. 6 also illustrates an example of eight displacement points U1 to U8 formed when the arbitrary displacement values are mapped.

Meanwhile, when the positions of the displacement points are determined, the training control unit 100 may consider the geometry corresponding to the normalized training data as an analysis domain and discretize the geometry (S402). Therefore, the geometry (normalized training data) generated as illustrated in (a) of FIG. 5 can be discretized into a set of a plurality of finite elements as illustrated in (b) of FIG. 5.

When the geometry is discretized into the plurality of finite elements in step S402, the training control unit 100 may determine Gaussian integration points, that is, Gauss points from the discretized domain (S404).

And when the positions of the integration points are determined, the training control unit 100 may analyze the discretized analysis domain (the geometry corresponding to the normalized training data) based on the Poisson's ratio applied to the training data, so as to compute strain values at the respective integration points, as illustrated in (c) of FIG. 6 (S406).

To this end, in step S406, the training control unit 100 may detect domains including the integration points in the discretized analysis domain (the geometry corresponding to the normalized training data), and compute strains for the domains including the integration points in a manner of computing strains for four-node finite elements with respect to the detected domains.

In this case, in a sub finite element, nodal displacements of standard 4-node finite elements including the integration points may be computed. A matching matrix (strain displacement matrix) of the four-node finite elements may be computed based on the computed nodal displacements of the standard four-node finite elements, and the strains may be obtained based on the computed matching matrix.

In this case, the strain values obtained at the integration points may be vectors and computed in different directions ($\varepsilon_{xx}$, $\varepsilon_{xy}$, $\gamma_{xy}$), respectively, as illustrated in (c) of FIG. 6. Therefore, when there are 9 integration points calculated from the discretized geometry, 27 (9×3) strain values may be obtained as illustrated in (c) of FIG. 6.

On the other hand, when the strain values are computed in step S406 of FIG. 4, the training control unit 100, as illustrated in (d) of FIG. 6, may map the geometry in which the displacement points have been set in step S400 with the strain values of the integration points computed in step S406. In addition, the training control unit 100 may generate a data set corresponding to the training data based on the geometry in which the displacement points and the strain values are mapped with each other (S204, FIG. 2).

Figure 7:
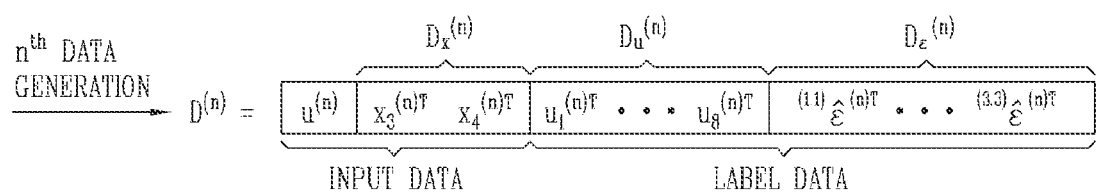
FIG. 7 is a diagram illustrating a data set including attribute information, geometric information, displacement points, and strain values, generated in a deep learning system in accordance with an implementation of the present disclosure.

FIG. 7 is a diagram illustrating a data set including attribute information, geometric information, displacement points, and strain values, generated in the deep learning system 10 in accordance with the implementation of the present disclosure.

Referring to FIG. 7, the training control unit 100 of the deep learning system 10 may generate a data set which includes input data actually input to the deep learning network 130 and label data including displacement points and strain values of training data corresponding to the input data. In this case, the label data may include information related to 8 displacement points, and may also include 27 strain values as described above.

Here, the input data may include attribute information, i.e., the Poisson's ratio, and geometric information, i.e., the position information related to the variable points. The label data may indicate the strain values of the training data corresponding to the input attribute information and geometric information. The label data may be compared with results computed when input data is input to the deep learning network 130, namely, the strain values according to the matching matrix, thereby being used as a criterion for determining the matching matrix is suitable.

When the data set including the input data and the label data is generated in step S204 of FIG. 2, the training control unit 100 may input the input data to the deep learning network 130. The training control unit 100 may compute differences between strain values of the label data and strain values obtained from B matrix, namely, the matching matrix generated through the deep learning network 130, and train the deep learning network 130 according to a cost function for approximating the computed differences to '0' (S206). The cost function may be expressed as shown in Equation 2 below.

$$C(\theta) = \frac{1}{27M} \sum_{n=1}^{M} \sum_{i=1}^{3} \sum_{j=1}^{3} \sum_{k=1}^{3} {}^{(i,j)}w \left| \frac{\sum_{l=1}^{16} \left( {}^{(i,j)}_{output} b_{kl}^{(n)}(\theta) u_l^{(n)} \right) - {}^{(i,j)}\hat{\varepsilon}_k^{(n)}}{{}^{(i,j)}\hat{\varepsilon}_k^{(n)}} \right| \quad \text{[Equation 2]}$$

Here, ${}^{(i,j)}_{output} b_{kl}^{(n)}(\theta)$ denotes a value of a kth row and l th column of the matching matrix (${}^{(i,j)}_{output} b^{(n)}(\theta)$) computed through the deep learning network, ${}^{(i,j)}\hat{\varepsilon}_k^{(n)}$ denotes a reference strain value (${}^{(i,j)}\hat{\varepsilon}_1^{(n)} = {}^{(i,j)}\hat{\varepsilon}_{xx}^{(n)}$, ${}^{(i,j)}\hat{\varepsilon}_2^{(n)} = {}^{(i,j)}\hat{\varepsilon}_{yy}^{(n)}$, and ${}^{(i,j)}\hat{\varepsilon}_3^{(n)} = {}^{(i,j)}\hat{\gamma}_{xy}^{(n)}$), $u_l^{(n)}$ denotes a reference displacement, $\theta$ denotes a weight of the deep learning network, M denotes the number of training data, and ${}^{(i,j)}w$ denotes a weight factor corresponding to Gaussian point (i, j).

On the other hand, when the input data (attribute information (e.g., Poisson's ratio) and geometric information) of the data set is input to the deep learning network 130 in step S206 of FIG. 2, the training control unit 100 may generate a matching matrix according to weight values of factors constituting the layers of the deep learning network 130.

Then, according to the cost function shown in Equation 2, the generated matching matrix may be multiplied by the displacement values of the label data corresponding to the input data to compute the strain values, and the computed strain values and the reference strain values of the label data corresponding to the input data may be compared with each other to calculate differences between the strain values.

In addition, at least one of the weights of the deep learning network 130 may be changed so that the calculated differences are approximated to a preset value, for example, zero ('0'). That is, when the attribute information and the geometric information are input, the training control unit 100 may train the deep learning network 130 according to the cost function such that a matching matrix, which is multiplied by the displacements to compute the reference strain values, is generated. In this case, the training control unit 100 may perform training for each reference strain value corresponding to the label data according to the cost function.

On the other hand, according to the training process illustrated in FIG. 2, the deep learning network 130 may generate the matching matrix for outputting strain values of the normalized finite element corresponding to specific attribute information (e.g., Poisson's ratio) and geometric information, that is, position information related to the variable points when the displacements, namely, the vector information related to each node are input.

Meanwhile, the deep learning system 10 according to the implementation of the present disclosure may implement a rigid body motion that prevents strains of objects when external forces such as collisions are applied, through the trained deep learning network 130. In this case, the rigid body motion may be sufficiently performed even through the training of the deep learning network 130, but it may also be possible to further apply a preset transformation matrix to the matching matrix so as to transform the matching matrix to a matrix in which strains are not generated with respect to the rigid body motion.

Figure 8:
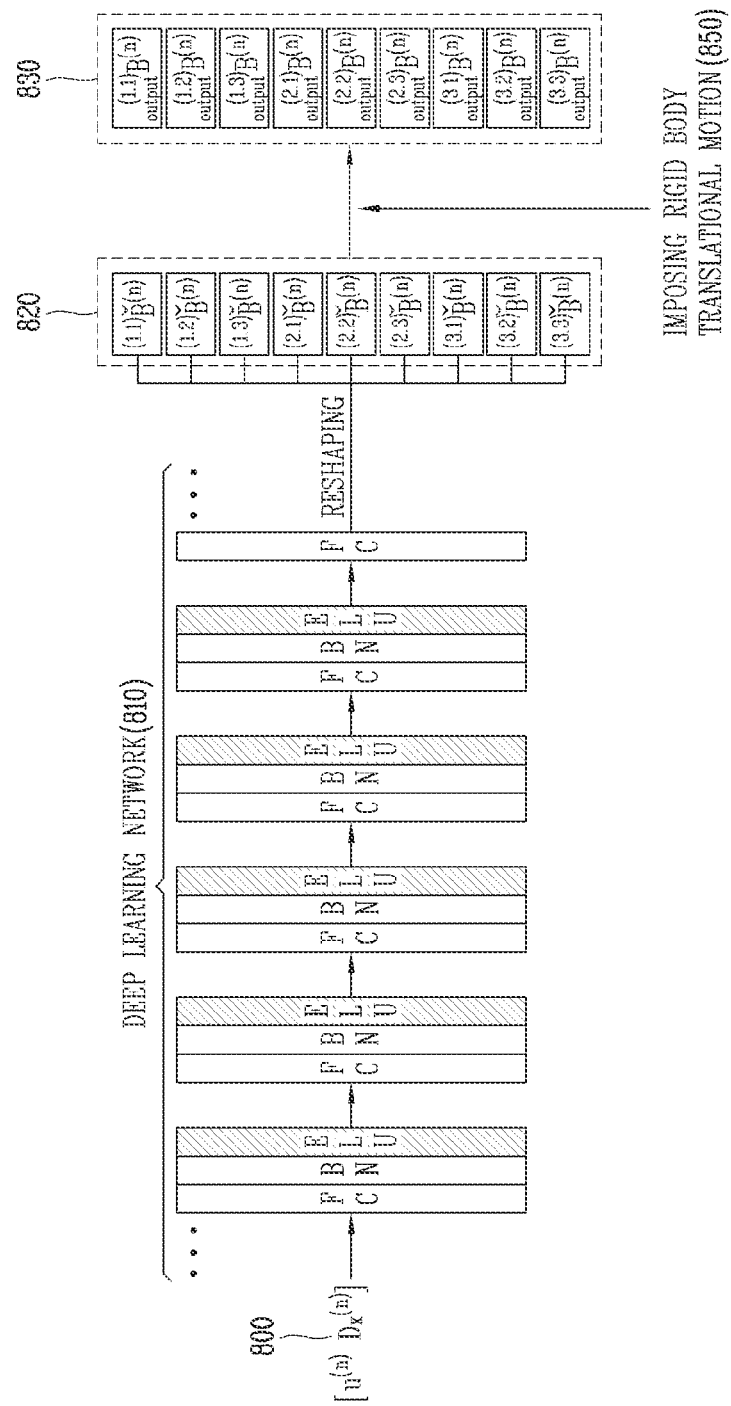
FIG. 8 is an exemplary view illustrating a structure of a deep learning network of generating a matching matrix according to input attribute information and geometric information in a deep learning system in accordance with an implementation of the present disclosure.

FIGS. 8 and 9 are diagrams conceptually illustrating a process of transforming the matching matrix generated through the trained deep learning network 130 into a matrix that imposes strains from being generated with respect to a rigid body motion.

First, FIG. 8 is an exemplary view illustrating a structure of a deep learning network of generating a matching matrix according to input attribute information and geometric information in the deep learning system 10 in accordance with the implementation of the present disclosure.

In FIG. 8, a deep learning network 810 may be a deep learning network which is trained based on the cost function of Equation 2 through the operation of FIG. 2. Accordingly, when input data, namely, attribute information and geometric information are input, a matching matrix capable of matching displacements (vector information regarding each node) and strain values may be generated.

On the other hand, FIG. 8 assumes an example of inputting the Poisson's ratio, which has a large influence on a strain value, as the attribute information input to the deep learning network 810. However, the present disclosure is not limited thereto, and other information in addition to the Poisson's ratio may also be further included as the attribute information.

Meanwhile, the deep learning network 810 may be provided with a plurality of layers each including a fully connected network (FC), a batch normalization (BN), and an exponential linear unit (ELU). In addition, each layer may have a plurality of factors (neuron factors), and different weights may be set. Meanwhile, the layered structure of the deep learning network 810 illustrated in FIG. 8 is conceptually illustrated to help the understanding of the present disclosure, and the present disclosure is not limited thereto.

Referring to FIG. 8, when input data 800 including Poisson information and geometric information is input to the deep learning network 810, the deep learning network 810 may generate a matching matrix $(^{(i,j)}\tilde{B}^{(n)}(\theta))$ 820 corresponding to the input data based on the weight set for each factor or each layer according to a training result. And a preset transformation matrix ($\Delta u$) 850 may be applied to an initial matching matrix $(^{(i,j)}\tilde{B}^{(n)}(\theta))$ 820 generated as shown in Equation 3 below, so as to add non-linear characteristics to the matching matrix having linear characteristics, thereby generating a matrix in which strains are not generated even with respect to the rigid body motion, namely, a matrix $(^{(i,j)}_{output}B^{(n)}(\theta))$ 830 to which a zero energy mode is applied.

$$^{(i,j)}_{output}B^{(n)}(\theta)\Delta u = 0 \quad \text{[Equation 3]}$$

The three strain components ($\varepsilon_{xx}$, $\varepsilon_{yy}$, and $\gamma_{xy}$) should be zero for the x- and y-directional rigid body translations at all 3×3 Gauss points, which yields the following equations:

$$\sum_{l=1}^{8} {}^{(i,j)}_{output}b_{kl}^{(n)}(\theta) = 0 \text{ and } \sum_{l=9}^{16} {}^{(i,j)}_{output}b_{kl}^{(n)}(\theta) = 0$$

for i, j, k=1, 2, 3.

where $^{(i,j)}B^{(n)}(\theta)$ denotes a matching matrix without a zero energy mode applied, $\Delta u$ denotes the displacement vector corresponding to rigid body translations, and $^{(i,j)}_{output}B^{(n)}(\theta)$ denotes a matching matrix with the zero energy mode applied.

In this case, the matching matrix to which the zero energy mode is not applied, i.e., the initial matching matrix $(^{(i,j)}\tilde{B}^{(n)}(\theta))$ 820 may be generated to correspond to the strain value of each integration point. Therefore, if there are 9 integration points determined from the discretized finite elements as described above, 9 matrices may be generated as illustrated in FIG. 8. In this case, each initial matching matrix $(^{(i,j)}\tilde{B}^{(n)}(\theta))$ 820 may be generated as a matrix having a size of [3×14].

For the matching matrix having this size, the transformation matrix may be a matrix that transforms each initial matching matrix $(^{(i,j)}\tilde{B}^{(n)}(\theta))$ to further include columns in which strains are not changed with respect to the rigid body motion.

Accordingly, when each initial matching matrix $(^{(i,j)}\tilde{B}^{(n)}(\theta))$ 820 has the size of [3×14] as described above, the transformation matrix may be a matrix having a size of [14×16] as illustrated in FIG. 9. As each initial matching matrix $(^{(i,j)}\tilde{B}^{(n)}(\theta))$ 820 is multiplied by the transformation matrix, 9 matching matrices $(^{(i,j)}_{output}B^{(n)}(\theta))$ to which the zero energy mode is applied may be generated.

Here, FIG. 9 illustrates an example of a transformation matrix for transforming an initially computed matching matrix into a matching matrix having a zero energy mode, in order to help understanding of the present disclosure. However, the transformation matrix according to the implementation of the present disclosure may not be limited to the matrix illustrated in FIG. 9.

On the other hand, the matching matrix to which the zero energy mode is applied may also be obtained through training for the deep learning network. Therefore, when training for obtaining the matching matrix with the zero energy mode applied is further applied to the deep learning network, there is no need to apply the transformation matrix shown in Equation 3 and FIG. 9. However, in this case, training and computation for the deep learning network may increase more.

Meanwhile, the foregoing description has been given in detail of the deep learning system 10 for training the deep learning network to generate the matching matrix that matches strains and displacements based on the attribute information and geometric information of the discretized finite elements.

Hereinafter, a description will be given of an apparatus for generating a stiffness matrix from an actual analysis domain according to an implementation of the present invention, by using the deep learning network trained according to the description of FIGS. 1 to 9.

In general, when the finite element method is applied to an object, it is converted into a numerical analysis problem solving a matrix equation [K]u=F. Here, a matrix [K] denotes a stiffness matrix, a matrix F denotes a load vector, and a matrix u denotes an unknown quantity to be obtained, that is, an approximate strain value of the object.

Here, the stiffness matrix indicates a degree of strength of an object and is determined depending on a material, thickness, and structure of the object. The stiffness matrix may be computed in a manner of adding up stiffness matrices calculated for respective finite elements in an element mesh.

FIG. 10 is a block diagram illustrating a structure of a stiffness matrix generation apparatus 20 for generating a stiffness matrix of an actual analysis domain using a deep learning network trained from a deep learning system in accordance with an implementation of the present disclosure.

As illustrated in FIG. 10, a stiffness matrix generation apparatus 20 according to an implementation of the present disclosure may include a control unit 1000, a discretization unit 1010 connected to the control unit 1000, a normalization unit 1020, a deep learning network 1030, a reverse transcription unit 1040, and a memory 1050. FIG. 10 illustrates the stiffness matrix generation apparatus 20 having such various components, but it may be understood that implementing all of the illustrated components is not a requirement. Greater or fewer components may alternatively be implemented.

More specifically, among the components, the discretization unit 1010 may discretize an analysis domain according to a finite element method among numerical analysis methods. That is, the discretization unit 1010 may discretize a set analysis domain into a plurality of finite elements.

And the normalization unit 1020 may transcribe any one extracted by the control unit 1000 among the plurality of finite elements into a form similar to training data generated in the deep learning system 10, that is, normalized training data.

Here, as described above, the data generation unit 110 of the deep learning system 10 may generate, as training data, a geometry which is defined by two fixed points connected to each other with being spaced apart by a preset unit distance '1', two variable points connected to the fixed points, respectively, a side connecting the fixed points, sides connecting the fixed points and the variable points, respectively, and a side connecting the variable points without intersecting with other sides.

Accordingly, the normalization unit 1020 may select two of the four vertices constituting the extracted one finite element as the fixed points. Here, the normalization unit 1020 may select vertices that form the longest side among the vertices of the extracted finite element as the fixed points. In addition, the normalization unit 1020 may rotate the extracted finite element based on any one of the selected fixed points so that the selected fixed points are horizontal.

In addition, the rotated finite element may be resized to be reduced or enlarged so that the distance between the fixed points satisfies the preset unit distance '1'. In addition, the normalization unit 1020 may store information related to an angle and direction that the finite element is rotated, information related to the resizing (reduction or enlargement) of the rotated finite element may be stored in the memory 1050 as transcription information that the extracted finite element is normalized.

Through this transcription process, the extracted finite element may be approximated to a shape similar to the geometry used as the training data of the deep learning system 10. In this case, the fixed points may be a first point X1 (coordinates (0,0)) and a second point X2 (coordinates (1,0)). And, among the four vertices of the extracted finite element, the remaining vertices other than the fixed points may be variable points (i.e., a third point X3 and a fourth point X4), respectively.

Meanwhile, when the extracted finite element is transcribed into the geometry normalized through the normalization unit 1020, the control unit 1000 may calculate coordinate information related to the variable points from the normalized geometry. Here, the coordinate information related to the variable points, as relative coordinates, may be information regarding relative positions according to the positions of the fixed points and the distance between the fixed points. That is, the position information related to the variable points may be position information which is calculated according to the distance (unit distance '1') between the first point and the second point based on the coordinates of the first point serving as the origin. In addition, the position information related to the variable points may be geometric information related to the normalized geometry.

Meanwhile, the control unit 1000 may set attribute information from the normalized geometry. Here, the attribute information may be the Poisson's ratio, and the Poisson's ratio may be a setting value set in the normalization unit 1020 according to the physical properties of a material corresponding to the analysis domain. Here, the Poisson's ratio may be a value determined through the training of the deep learning system 10 according to the physical properties of each material, and may be a value determined when the material is decided.

Meanwhile, when geometric information is determined and attribute information is set from the normalized geometry, the control unit 1000 may input the attribute information and the geometric information to the deep learning network 1030. Here, the deep learning network 1030 may be a deep learning network that has been completely trained through the deep learning system 10 according to the foregoing implementation of the present disclosure.

Accordingly, as illustrated in FIG. 8, when the attribute information and the geometric information are input, a matching matrix may be computed. The computed matching matrix may be a matching matrix capable of computing reference strain values when multiplied by displacements according to the cost function used for the training of the deep learning network.

In addition, the control unit 1000 may further apply the transformation matrix as illustrated in FIG. 9 to the matching matrix. In this case, the matching matrix generated through the deep learning network 1030 may be transformed into a matching matrix in which strain values are not generated even with respect to the rigid body motion, namely, a matching matrix having the zero energy mode.

Meanwhile, the reverse transcription unit 1040 may reversely transcribe the matching matrix generated through the deep learning network 1030, in correspondence with a reverse process of the transcription process performed in the normalization unit 1020, under the control of the control unit 1000. To this end, the reverse transcription unit 1040 may generate reverse transcription information for reversely transcribing the normalized geometry into the extracted finite element based on the transcription information stored in the memory 1050.

In addition, the reverse transcription unit 1040 may transform the matching matrix generated through the deep learning network 1030 (or the matching matrix having the zero energy mode) according to the reverse transcription information. Accordingly, the matching matrix generated through the deep learning network 1030 (or the matching matrix with the zero energy mode) can be transformed into the matching matrix for the geometry restored from the normalized geometry, that is, the finite element extracted by the discretization unit 1010.

Meanwhile, when a final matching matrix for the extracted finite element is generated through the reverse transcription unit 1040, the control unit 1000 may compute a stiffness matrix for the extracted finite element based on the final matching matrix. To this end, the control unit 1000 may perform numerical integration on the final matching matrix, and obtain the stiffness matrix as a result of the numerical integration.

FIG. 11 is a flowchart illustrating a process of generating a stiffness matrix from a finite element by a stiffness matrix generation apparatus 20 in accordance with an implementation of the present disclosure. Also, FIG. 12 is a conceptual diagram illustrating a process of generating a stiffness matrix from a finite element extracted from an analysis domain according to the process described in FIG. 11.

First, referring to FIG. 11, the stiffness matrix generation apparatus 20 according to the implementation of the present disclosure may first discretize an analysis domain according to the finite element method (S1100). And any one finite element 1110 for obtaining a stiffness matrix may be extracted from the discretized analysis domain (S1102).

In addition, the control unit 1000 may transcribe the extracted finite element into a preset normalized geometry (S1104). To this end, the control unit 1000 may set two vertices connected to each other among vertices of the extracted finite element as fixed points, and set the remaining vertices as variable points. In addition, the normalized geometry may be rotated based on any one of the fixed points so that the fixed points are horizontally connected to each other.

In addition, a distance between the fixed points may be set to a preset unit distance, and information related to relative positions of the variable points may be obtained based on any one of the fixed points. To this end, the control unit 1000 may enlarge or reduce the rotated finite element. In this manner, by rotating and/or enlarging or reducing the extracted finite element, the control unit 1000 may generate the normalized geometry 1120.

Meanwhile, when the normalized geometry 1120 is generated, the control unit 1000 may obtain geometric information and attribute information from the normalized geometry 1120. For example, the geometric information may be position information related to the obtained variable points. Also, the attribute information may be information calculated from the normalized geometry, namely, information related to an elastic modulus or the Poisson's ratio. For convenience of description, it is assumed that the attribute information is the Poisson's ratio.

When the normalized geometry is generated and the attribute information and the geometric information are obtained from the generated geometry through step S1104, the control unit 1000 may input the obtained attribute information and geometric information to the deep learning network 1030 (1130). And a matching matrix for matching displacements and strain values of the normalized geometry may be generated through the deep learning network 1030 (S1106).

Here, the deep learning network 1030 may be in a completely trained state by the deep learning system 10. Therefore, the deep learning network 1030 may be a deep learning network which has been trained to generate a matching matrix for computing strain values, which have differences from reference strain values by a preset value or less when multiplied by displacements, based on arbitrary attribute information and geometric information when the arbitrary attribute information and geometric information is input to the deep learning network 1030.

That is, the deep learning network 1030 may be in a trained state to generate a matching matrix for matching strain values having differences from the reference strain values, which are approximated to zero, with the displacements of the normalized geometry based on the arbitrary attribute information and geometric information.

Here, the step S1106 may further include applying the transformation matrix shown in FIG. 9 to the computed matching matrix. In this case, the matching matrix generated through the deep learning network 1030 may be transformed to a matching matrix in which strain values are not generated even with respect to the rigid body motion, namely, a matching material having the zero energy mode.

Meanwhile, when the matching matrix is generated in step S1106, the control unit 1000 may reversely transcribe the generated matching matrix to transform the matching matrix into a matching matrix for the finite element extracted from the analysis domain (S1108).

That is, in step S1108, the control unit 1000 may generate reverse transcription information for restoring the normalized geometry to the geometry according to the extracted finite element. In this case, the reverse transcription information may include resizing information for reducing or enlarging the normalized geometry to a size according to the extracted finite element. The reverse transcription information may also include rotation information for rotating the size-restored geometry in order to restore the normalized geometry to the geometry of the extracted finite element.

In addition, the control unit 1000 may reflect the reverse transcription information to the matching matrix computed in step S1106 (1140), and transform the matching matrix computed in step S1106 into the matching matrix for the geometry restored from the normalized geometry, that is, the extracted finite element (S1108).

Meanwhile, the control unit 1000 may correct the transformed matching matrix so that the stiffness matrix generated through the transformed matching matrix can pass a patch test such as a shearing test. This correction may be made by removing unnecessary strain energy from the transformed matching matrix (S1110). Here, removing the unnecessary strain energy may mean that the matching matrix is corrected so that an unnecessary strain value is not computed as in the zero energy mode.

For example, the matching matrix transformed in step S1108 may be a matching matrix in which other strain energy except for strain energy (strain values) according to stretching (e.g., shearing) in a horizontal direction (X-axis) or a vertical direction (Y-axis) is removed. In this case, the matching matrix may be a matching matrix in which stresses only in the X-axis and the Y-axis are output when stretching along directions of the X-axis and Y-axis.

To this end, the control unit 1000 may generate a matching matrix from which unnecessary strain energy is removed by applying a B-bar method, as expressed by Equation 4 below.

$$^{(i,j)}_{DL8}\overline{B} = {}^{(i,j)}_{DL8}B + {}_{DL8}B' \quad \text{[Equation 4]}$$

with $$_{DL8}B' = \frac{t}{V}\sum_{i=1}^{3}\sum_{j=1}^{3} {}^{(i,j)}w({}^{(i,j)}_{Q8}B - {}^{(i,j)}_{DL8}B)^{(i,j)}J$$

where $^{(i,j)}_{DL8}\overline{B}$ denotes a matching matrix from which unnecessary strain energy has been removed, $^{(i,j)}_{DL8}B$ denotes a matching matrix generated through the deep learning network, V denotes a volume of a finite element, $W$ denotes the Gaussian numerical integration weight, $^{(i,j)}_{Q8}B$ denotes a matching matrix of a standard 8-node finite element, t denotes a thickness, and J denotes a determinant of the Jacobian matrix.

On the other hand, when the matching matrix is corrected in step S1110, the control unit 1000 may numerically integrate the corrected matching matrix as expressed by Equation 5 below, to generate a stiffness matrix K corresponding to the finite element extracted in step S1100 (S1112).

$$K = t\sum_{i=1}^{p}\sum_{j=1}^{p} {}^{(i,j)}w^{(i,j)}\overline{B}^T C^{(i,j)}\overline{B}^{(i,j)}J \quad \text{[Equation 5]}$$

where t denotes a thickness, $\mathcal{W}$ denotes the Gaussian numerical integration weight, $^{(i,j)}\overline{B}$ denotes a corrected matching matrix, $^{(i,j)}\overline{B}^T$ denotes a transposed matrix of $^{(i,j)}\overline{B}$, $\overline{C}^{(i,j)}$ denotes a matrix in which strain is translated into stress, and J denotes a determinant of the Jacobian matrix.

According to at least one of implementations of the present disclosure, a trained deep learning network that is not dependent on a specific domain can be to obtained by approximating an analysis domain with respect to discretized finite elements according to a deep learning method. Accordingly, the trained deep learning network can be applied even when a domain is changed.

In addition, according to at least one of implementations of the present disclosure, a stiffness matrix can be generated from finite elements approximated through a trained deep learning network, and an entire analysis domain can be analyzed with a set of the approximated finite elements, which may result in computing a stiffness matrix of the entire analysis domain more quickly and accurately.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). In addition, the computer may alternatively include a training control unit 100 of the deep learning system 10 or a control unit 1000 of the stiffness matrix generation apparatus 20. Therefore, it should also be understood that the above-described implementations are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A finite element deep learning system comprising:
   a data generation unit configured to generate a finite element normalized with fixed points and variable points as training data;
   a strain computation unit configured to compute reference strain values based on the generated training data;
   a deep learning network including a plurality of layers having preset weights, respectively, and connected to one another, wherein the deep learning network is configured to generate a matching matrix for matching the reference strain values with displacements set in the training data according to arbitrary attribute information set in the training data and geometric information as position information related to the variable points; and
   a training control unit configured to:
      train the deep learning network with respect to a plurality of the training data generated by the data generation unit based on a cost function by which a difference between strain values computed according to the matching matrix and the reference strain values are equal to or smaller than a threshold value; and
      transform the matching matrix generated through the deep learning network into a matching matrix including a zero energy mode by reflecting a preset transformation matrix when the deep learning network is trained,
   wherein the trained deep learning network is independent from an analysis domain such that the trained deep learning network is applicable for finite element analysis upon a change to the analysis domain.

2. The system of claim 1, wherein the data generation unit is configured to generate a geometry, which is the normalized finite element, as the training data, the geometry formed by two fixed points connected to each other in a horizontal direction with being spaced apart by a preset unit distance, two variable points connected to the respective fixed points, a side connecting the fixed points, sides connecting the fixed points and the variable points, and a side connecting the variable points without intersecting with other sides.

3. The system of claim 2, wherein the data generation unit is configured to impose generation of training data unsuitable for training through a preset exclusion condition, and
   wherein the exclusion condition is set based on at least one of a range of an interior angle of the generated geometry and a ratio of lengths of the respective sides forming the geometry.

4. The system of claim 1, wherein the arbitrary attribute information is a Poisson's ratio that is arbitrarily set with respect to the generated training data.

5. The system of claim 1, wherein the strain computation unit is configured to discretize a geometry corresponding to the training data by assuming that the geometry is the analysis domain, to determine positions of integration points from the discretized analysis domain, to compute strain values corresponding to the integration points by reflecting the attribute information applied to the training data, and to store the computed strain values of the respective integration points as the reference strain values.

6. The system of claim 1, wherein the strain computation unit is configured to determine displacement points by applying displacements according to a preset condition to the geometry corresponding to the training data, and to generate a data set including the determined displacement points, the reference strain values, the attribution information applied to the training data, and the geometric information.

7. The system of claim 6, wherein the data set includes input data input to the deep learning network, and label data for verifying the matching matrix generated from the deep learning network to which the input data is input,
   wherein the input data includes the attribute information set in the training data and geometric information related to the training data, and
   wherein the label data is identification information related to the training data corresponding to the input data, the label data including displacements set in the training data corresponding to the input data and reference strain values computed from the training data corresponding to the input data.

8. The system of claim 1, wherein the cost function is configured to compute differences between the reference strain values and results obtained by multiplying the matching matrix, generated as a result of inputting the attribution information and the geometric information to the deep learning network, by displacements of the training data corresponding to the attribution information and the geometric information, and wherein the training control unit is configured to train the deep learning network to generate a matching matrix in which values of the cost function are approximated to zero.

* * * * *